United States Patent
Liu et al.

(10) Patent No.: US 11,450,061 B2
(45) Date of Patent: Sep. 20, 2022

(54) PROCESSING METHOD AND APPARATUS FOR VIRTUAL RESOURCE IN GAME SCENE

(71) Applicant: NETEASE (HANGZHOU) NETWORK CO., LTD., Zhejiang (CN)

(72) Inventors: Zhijie Liu, Zhejiang (CN); Zhirong Du, Zhejiang (CN); Yongchao Pei, Zhejiang (CN); Dongdong Wu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/965,301

(22) PCT Filed: Nov. 21, 2018

(86) PCT No.: PCT/CN2018/116748
§ 371 (c)(1),
(2) Date: Jul. 28, 2020

(87) PCT Pub. No.: WO2019/148942
PCT Pub. Date: Aug. 8, 2019

(65) Prior Publication Data
US 2021/0118221 A1 Apr. 22, 2021

(30) Foreign Application Priority Data
Feb. 2, 2018 (CN) .......................... 201810107779.5

(51) Int. Cl.
*G06T 15/50* (2011.01)
*A63F 13/52* (2014.01)
(Continued)

(52) U.S. Cl.
CPC .......... *G06T 15/506* (2013.01); *A63F 13/426* (2014.09); *A63F 13/52* (2014.09);
(Continued)

(58) Field of Classification Search
CPC ... G06T 15/20; G06T 15/506; G06T 2210/36; A63F 2300/66; A63F 2300/6692;
(Continued)

(56) References Cited

U.S. PATENT DOCUMENTS 5,577,960 A * 11/1996 Sasaki ...................... G06T 15/04
345/428
5,952,993 A * 9/1999 Matsuda .................. G06T 13/20
345/474
(Continued)

FOREIGN PATENT DOCUMENTS

CN  104134230 A  11/2014
CN  105094345 A  11/2015
(Continued)

OTHER PUBLICATIONS

Akenine-Moller, Thomas and Eric Haines. "Real-Time Rendering." 2nd ed. (2002), pp. 67-75 and 80-84. (Year: 2002).*
(Continued)

*Primary Examiner* — Daniel F Hajnik
(74) *Attorney, Agent, or Firm* — Gang Yu

(57) ABSTRACT

A processing method and apparatus for a virtual resource in a game scene are provided. The method comprises: combining, according to a preset rule, multiple virtual resources (21) to form a virtual resource group (20), acquiring a first rendering parameter of the virtual resource group (20), and performing first render processing according to the first rendering parameter and in a unit of the virtual resource group (20); determining, according to a preset condition, at least one of the virtual resources (21) constituting the virtual
(Continued)

resource group (20) to be a particular virtual resource (22); and processing the particular virtual resource (22) in a preset second processing manner, and presenting a preset visual effect.

15 Claims, 6 Drawing Sheets

(51) Int. Cl.
   *G06T 15/20* (2011.01)
   *A63F 13/426* (2014.01)
   *A63F 13/822* (2014.01)
(52) U.S. Cl.
   CPC ............ *A63F 13/822* (2014.09); *G06T 15/20* (2013.01); *A63F 2300/66* (2013.01)
(58) Field of Classification Search
   CPC ........ A63F 13/426; A63F 13/52; A63F 13/55; A63F 13/573; A63F 13/60; A63F 13/822; A63F 13/833
   See application file for complete search history.

(56) References Cited

U.S. PATENT DOCUMENTS

| | | | |
|---|---|---|---|
| 2003/0210271 A1* | 11/2003 | King | G09G 5/363 715/771 |
| 2010/0095249 A1* | 4/2010 | Yoshikawa | A63F 13/211 715/856 |
| 2018/0353857 A1* | 12/2018 | Ito | A63F 13/5252 |

FOREIGN PATENT DOCUMENTS

| | | |
|---|---|---|
| CN | 105159687 A | 12/2015 |
| CN | 105214309 A | 1/2016 |
| CN | 105894566 A | 8/2016 |
| CN | 106898040 A | 6/2017 |
| CN | 107067364 A | 8/2017 |
| CN | 108434742 A | 8/2018 |
| JP | 2015084975 A | 5/2015 |
| WO | 2018019272 A | 2/2018 |

OTHER PUBLICATIONS

Garcia, Ismael, Mateu Sbert, and László Szirmay-Kalos. "Tree rendering with billboard clouds." Budapest, 3rd Hungarian Confrence, Computer Graphic and Geometry (2005). (Year: 2005).*

Ryder, G., et al. "Adaptive Crowd Behaviour to Aid Real-Time Rendering of a Cultural Heritage Environment." The 5th International Symposium on Virtual Reality, Archaeology and Cultural Heritage VAST (2004) K. Cain, Y. Chrysanthou, F. Niccolucci, N. Silberman (Editors) (Year: 2004).*

* cited by examiner

First virtual resource model		Second virtual resource model

PROCESSING METHOD AND APPARATUS FOR VIRTUAL RESOURCE IN GAME SCENE

CROSS-REFERENCE TO RELATED APPLICATION

The present application claims benefit of Chinese Patent Application No. 201810107779.5, filed to the China Patent Office on Feb. 2, 2018, entitled "Processing Method and Apparatus for Virtual Resource in Game Scene", the contents of which are hereby incorporated by reference in its entirety.

TECHNICAL FIELD

The present disclosure relates to the technical field of games, and in particular to a processing method and apparatus for a virtual resource in a game scene.

BACKGROUND

In the wave of the Internet, the continuous development and evolution of hardware and software technologies have promoted the emergence of smart devices and software. At the same time, a large number of games with different themes have emerged to meet the needs of users.

A game application, running on a terminal currently, has a variety of different themes and game play types, and the combination of a variety of different game plays to improve the playability of games is currently the development direction of the field. For example, a shoot type game and a building type game are combined, and a strategy type game and a parkour type game are combined.

It is to be noted that the information disclosed in the Background is only for enhancement of understanding of the background of the present disclosure, and thus may include information that does not constitute the conventional art known to those of ordinary skill in the art.

SUMMARY

The objective of the present disclosure is to provide a processing method and apparatus for a virtual resource in a game scene, a mobile terminal, and a storage medium, which overcome, at least to some extent, one or more problems due to limitations and disadvantages of the related art.

In order to solve the above problem, one embodiment of the present disclosure provides a processing method for a virtual resource in a game scene. The method may include that:

according to a preset rule, multiple virtual resources are combined to form a virtual resource group, a first rendering parameter of the virtual resource group is acquired, and first render processing is performed according to the first rendering parameter and in a unit of the virtual resource group;

according to a preset condition, at least one of the virtual resources constituting the virtual resource group is determined to be a particular virtual resource; and the particular virtual resource is processed in a preset first processing manner, and a preset visual effect is presented.

One embodiment of the present disclosure also provides a processing apparatus for a virtual resource in a game scene, which may include:

a first rendering module, configured to combine, according to a preset rule, multiple virtual resources to form a virtual resource group, acquire a first rendering parameter of the virtual resource group, and perform first render processing according to the first rendering parameter and in a unit of the virtual resource group;

a determination module, configured to determine, according to a preset condition, at least one of the virtual resources constituting the virtual resource group to be a particular virtual resource; and a second processing module, configured to process the particular virtual resource in a preset first processing manner, and present a preset visual effect.

One embodiment of the present disclosure also provides a mobile terminal, which may include:

a processor; and a memory, configured to store an executable instruction of the processor, where the processor is configured to perform the above processing method by executing the executable instruction.

According to an embodiment of the present disclosure, a computer storage medium is also provided, which may include a computer program that implements, when executed by a processor, the above processing method.

BRIEF DESCRIPTION OF THE DRAWINGS

The above and other features and advantages of the present disclosure will become more apparent from the detailed description of exemplary embodiments with reference to the drawings. It is apparent that the drawings in the following description are only some embodiments of the present disclosure, and other drawings can be obtained from those skilled in the art according to these drawings without any creative work. In the drawings.

DETAILED DESCRIPTION OF THE EMBODIMENTS

Figure 1:
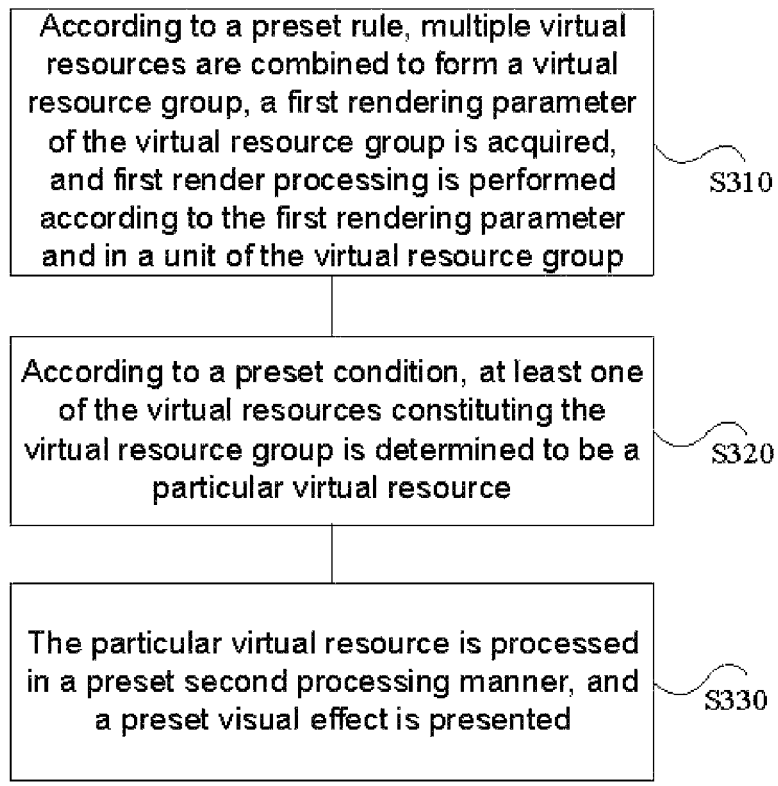
FIG. 1 is a flowchart of a processing method for a virtual resource in a game scene according to an embodiment of the present disclosure.

It is to be noted that in the case of no conflict, the features in the embodiments and the embodiments in the present disclosure may be combined with each other. The disclosure is described below with reference to the drawings and in conjunction with the embodiments in detail.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are only a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the disclosure described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

It is also to be noted that various triggering events disclosed in the present specification may be preset, and may also be set in real time according to operating instructions of users in a program running process. Different triggering events may trigger to execute different functions.

FIG. 1 is a processing method for a virtual resource in a game scene described and disclosed according to an embodiment. In the present implementation manner, a processing method for a virtual resource in a game scene is illustrated by different examples. The processing method for a virtual resource in a game scene provided in the present implementation manner is performed on a mobile terminal. The mobile terminal may be any terminal device such as a computer, a tablet computer, or an electronic device. A software application is executed on a processor of the mobile terminal, a graphical user interface is obtained by rendering on a touch display of the mobile terminal, the content displayed by the graphical user interface at least partially includes a local or global game scene, and the game scene includes a game picture and at least one virtual character 10.

Figure 2A:
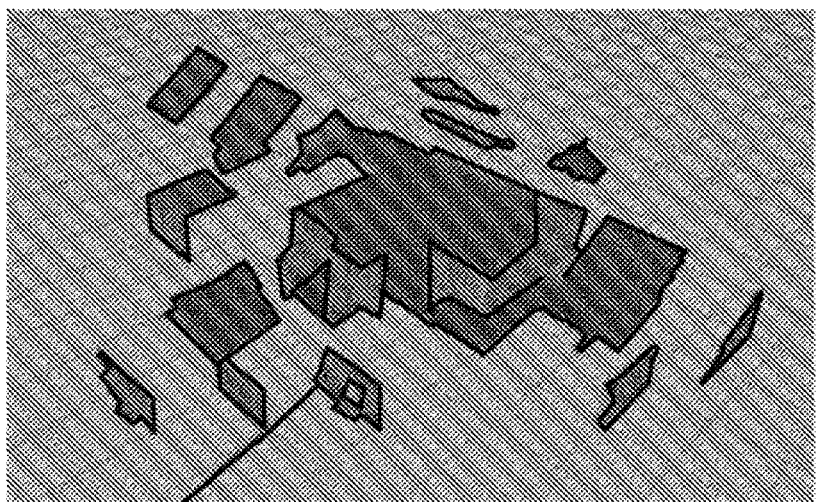
FIG. 2A is an exploded view of a virtual resource group constituted by multiple virtual resources according to an embodiment of the present disclosure.
Figure 2B:
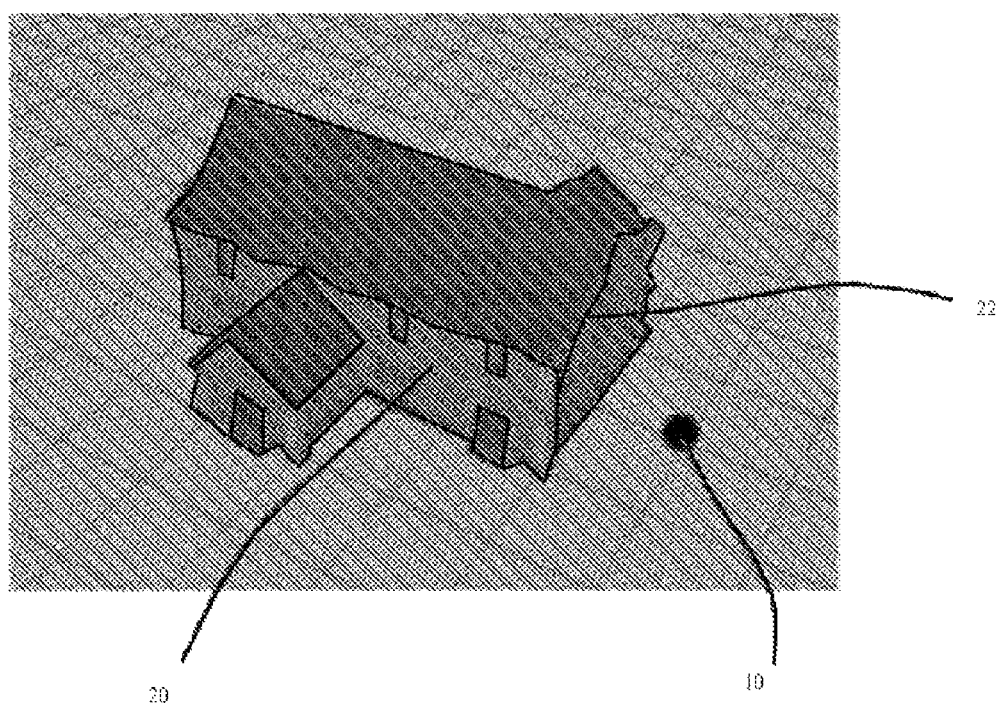
FIG. 2B is an assembly view of the virtual resource group constituted by multiple virtual resources shown in FIG. 2A.

As shown in FIG. 2A and FIG. 2B, the game picture may include a virtual resource group 20 relatively fixed in position, e.g., a virtual resource group 20 such as ground, mountains, stones, flowers, grass, trees, or buildings. It is to be noted that the virtual resource group 20 in the present disclosure includes at least one virtual resource 21, that is, the virtual resource group 20 may be composed of at least one virtual resource 21, and the virtual resource group 20 may be each virtual character in the game scene, such as the ground, mountains, stones, flowers, grass, trees, or buildings mentioned above. The virtual resource 21 is an element constituting each virtual character. For example, when a virtual model 20 is a house, the virtual resource 21 is a wall, a roof, or the like constituting the house. The virtual resource group 20 is divided into a dynamic virtual resource group 20 and a static virtual resource group 20. The dynamic virtual resource group 20 refers to a virtual resource group 20 that may respond to a control instruction input by a user through the mobile terminal. Further, the dynamic virtual resource group 20 is divided into a reconfigurable virtual resource 20 and a non-reconfigurable virtual resource 20. The reconfigurable virtual resource group 20 is the virtual resource that can be attacked or can be associated with the newly generated virtual resource group 20. For example, the reconfigurable virtual resource group 20 is a building such as a house. When it is attacked, it may be damaged or even disappeared. A new building may be built on the basis of the house, wherein the association relationship is that the associated virtual resource groups 20 may affect the state changes. Specifically, when a new building is built on a reconfigurable virtual resource group 20, such as a house, the new building will be associated with the house. When the house is attacked to be disassembled, the new building associated with the house will be disassembled together. The non-reconfigurable virtual resource group 20 can establish a physical relationship with the newly generated virtual resource group 20. For example, the non-reconfigurable virtual resource group 20 is a road, a bridge, a terrain, etc., and new buildings may be built and physically supported on these non-reconfigurable virtual resource groups 20. The static virtual resource group 20 is a virtual resource group 20 that cannot respond to the control instruction input by the user through the mobile terminal, such as grass, shrubs and water in the game picture.

The virtual character 10 may be a virtual character 10 of an enemy camp, or may be a virtual character 10 of an own camp. The virtual character 10 may perform corresponding actions in the game scene in response to an operation of a user. For example, the user may control the virtual character 10 to walk, run, squat, bend, attack, shoot, etc. in the game scene. The present disclosure is not limited herein.

A processing method for a virtual resource in a game scene provided in the present implementation manner includes the following steps:

At step S310, according to a preset rule, multiple virtual resources 21 are combined to form a virtual resource group 20, a first rendering parameter of the virtual resource group 20 is acquired, and first render processing is performed according to the first rendering parameter and in a unit of the virtual resource group 20.

At step S320, according to a preset condition, at least one of the virtual resources 21 constituting the virtual resource group 20 is determined to be a particular virtual resource 22.

At step S330, the particular virtual resource 22 is processed in a preset first processing manner, and a preset visual effect is presented.

In the above implementation manner, multiple virtual resources 21 in a game scene are combined into a virtual resource group 20 according to a preset rule, a first rendering parameter of the virtual resource group 20 is acquired during rendering, and then a rendering action of rendering the virtual resource group 20 is completed by acquiring the first rendering parameter once, thereby effectively reducing the number of DC and improving the usage rate of a processor. When interacting with a virtual resource 21 in the game scene, for example, performing operations such as attack, disassembly and repair, at least one of the virtual resources 21 in the virtual resource group 20 is determined as a particular virtual resource 22 according to a preset condition, and the particular virtual resource 22 is processed in a second processing mode different from a first rendering process mode. In this way, in the case of reducing DC and improving the usage rate of the processor, the virtual resource 21 in the virtual resource group 20 may be independently processed to achieve a preset visual effect.

Each step of the processing method for a virtual resource in a game scene in the present exemplary embodiment will be further described below.

In step S310, according to a preset rule, multiple virtual resources 21 are combined to form a virtual resource group 20, a first rendering parameter of the virtual resource group 20 is acquired, and first render processing is performed according to the first rendering parameter and in a unit of the virtual resource group 20.

The preset rule is determined according to parameter information of the virtual resource 21. In the present implementation manner, the parameter information is location information of the virtual resource 21, and it is determined that the virtual resources 21 whose location information satisfies a preset distance form the virtual resource group 20. For example, it is determined that the different virtual resources 21 within a distance of 5 m are one virtual resource group 20. For example, each wall constituting one house may be one virtual resource group 20, or two adjacently built houses may be one virtual resource group 20. In other implementation manners, the parameter information is a type of the virtual resource 21, and the virtual resources 21 of the same type are determined to form the virtual resource group 20. For example, all the virtual resources 21 of a house type may be determined as one virtual resource group 20. The virtual resources 21 of an irregular type are determined as one virtual resource group 20. In other implementation manners, the parameter information may be other parameters that are set according to the efficiency requirements of the game operation.

Figure 3:
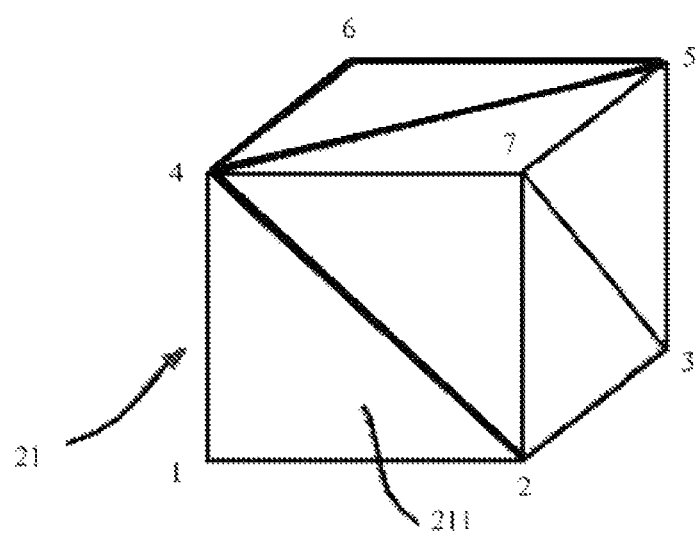
FIG. 3 is a schematic diagram of a virtual resource constituted by geometric patches according to an embodiment of the present disclosure.

As shown in FIG. 3, in a game picture, each virtual resource 21 is composed of multiple geometric patches 211, which may be triangular, rectangular, or the like. In a model space, a model of the virtual resource 21 is determined by recording vertex information of all the geometric patches 211 constituting the virtual resource 21, where the vertex information includes parameters related to the specific performance of the virtual resource 21 in the game scene. The parameters related to the specific performance include, but are not limited to, vertex coordinates, map coordinates, vertex normals, vertex tangent lines, vertex colors, map coordinates of vertex lighting maps, and the like.

The first rendering parameter is a parameter related to the specific performance in all the virtual resources 21 constituting the virtual resource group 20. After the virtual resources 21 constitute a virtual resource group 20 according to a preset rule, when the virtual resource group 20 is rendered, the virtual resource group 20 corresponding to the first rendering parameter may be rendered according to the first rendering parameter by a minimum rendering batch that meets the requirements of a rendering engine. For example, if a virtual resource group 20 includes 10,000 vertices, assuming that a single rendering batch supported by the adopted rendering engine may include a maximum of 5,000 rendering vertices, two batches may be used to complete rendering of the virtual resource group 20. If a single rendering batch supported by the adopted rendering engine may include a maximum of 10,000 rendering vertices, one rendering batch may be used to complete rendering of the virtual resource group 20.

For a game type that combines a shoot type game with a building game, since there are a large number of detachable and buildable models in a game scene, all models occupy a very large memory, and a terminal with a small memory may not be able to withstand it. Even with enough memory, so many trivial subdivision models may put a lot of pressure on the terminal in terms of data processing and graphics rendering.

Compared with the traditional art in which rendering is performed in a unit of each virtual resource 21, the above implementation manners greatly reduce the rendering batches, mainly save, in fact, the time of the processor, reduce the number of communications with a graphics processor, and improve the image rendering efficiency.

A game program running on the mobile terminal acquires at least one virtual resource group 20 corresponding to the perspective of the virtual character 10 in the game scene according to the perspective of the virtual character 10, and first render processing is performed according to the first rendering parameter in a unit of the virtual resource group 20. As shown in FIG. 2B, the virtual resource group 20 faced by the virtual character 10 is determined.

Figure 4:
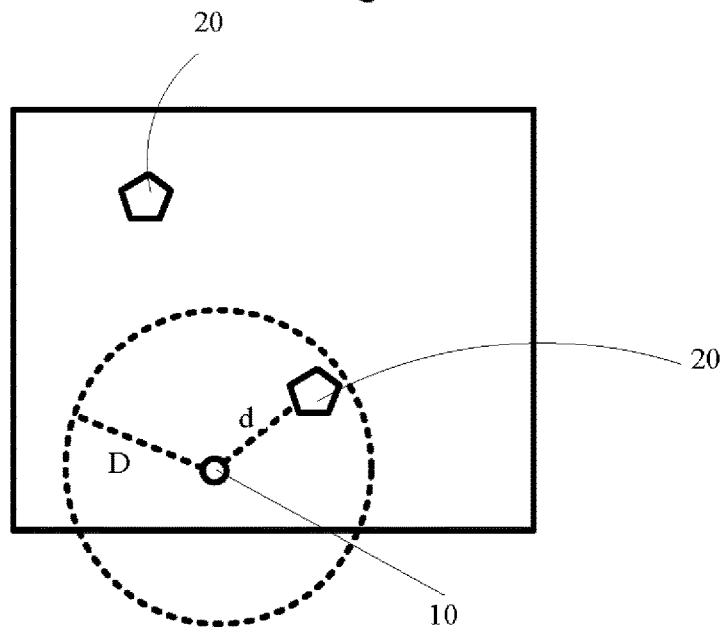
FIG. 4 is a schematic diagram of determining a sub-render processing mode by a corresponding distance between a virtual character and a virtual resource according to an embodiment of the present disclosure.

As shown in FIG. 4, in the present implementation manner, the first render processing includes at least two sub-render processing modes divided according to preset distance information D. Different sub-render processing modes correspond to different preset distance information D. The preset distance information D is used to determine whether a virtual target is in a specific range. In the present implementation manner, the virtual target is the virtual resource 21 or the virtual resource group 20 in the game scene, for example, a house, a car, a mountain, a tree, other virtual characters 10, etc., in the game scene. In the present implementation manner, the specific setting of the preset distance information D is determined according to state information of the virtual character 10. In the present implementation manner, the state information of the virtual character 10 is the type of a weapon currently used by the virtual character 10. For example, when the type of the weapon is a weapon that does not have a zoom function, such as a shovel or a brick, the preset distance information D is N, the virtual resource 21 in the N range corresponds to the first sub-render processing mode, and the virtual resource 21 outside the N range corresponds to the second sub-render processing mode; when the type of the weapon is a weapon having a zoom function, for example, a rifle using a double magnifying glass, the preset distance information D is 2N, the virtual resource 21 in the 2N range corresponds to the first sub-render processing mode, and the virtual resource 21 outside the 2N range corresponds to the second sub-render processing mode. In other implementation manners, the specific setting of the preset distance information D is determined according to the processing of the mobile terminal running the game program. For example, when the image processing capability of the mobile terminal is greater than a preset value, the preset distance information D is 2N, and the preset distance information D is N when the image processing capability of the mobile terminal is less than the preset value.

It is to be noted that the preset distance information D may be divided into multiple numerical regions, for example, 0 to N, N+1 to 2N, 2N+1 to 3N, etc., and the specific situation may be set according to the needs of a developer or a user.

In the present implementation manner, the step that a first rendering parameter of the virtual resource group 20 is acquired and first render processing is performed according to the first rendering parameter and in a unit of the virtual resource group 20 includes the following operations.

At step S3101, a corresponding distance d between the virtual resource group 20 and the virtual character 10 is determined according to the state information of the virtual character 10.

At step S3102, according to a comparison result of the corresponding distance d and the preset distance information D, a sub-render processing mode corresponding to the virtual resource group 20 is determined.

At step S3103, a first rendering parameter of the virtual resource group 20 corresponding to the sub-render processing mode is acquired, and sub-render processing is performed according to the first rendering parameter and in a unit of the virtual resource group 20.

Through the above implementation manners, according to the difference, whether the corresponding distance d between the virtual resource 21 and the virtual character 10 is within the preset distance information D is determined to determine a corresponding sub-render processing mode for processing the virtual resource group 20. This manner may implement the resource allocation for rendering the virtual resource 21, thereby obtaining a higher rendering operation.

In step 3101, a corresponding distance d between the virtual resource group 20 and the virtual character 10 is determined according to the state information of the virtual character 10. As shown in FIG. 4, the state information is information related to the content of a game picture currently displayed by a graphical user interface and related to the virtual character 10. In the present implementation manner, the state information is the location information and orientation of the virtual character 10, the position information of the virtual resource 21 corresponding to the orientation of the virtual character 10 and the location information of the virtual character 10 are acquired, and a corresponding distance d between the virtual character 10 and the virtual resource 21 is obtained by comparison calculation, where the location information may be spatial coordinates of the virtual resource 21 or the virtual character 10 in the game scene.

In other implementation manners, the state information may also be the location information and the perspective of the virtual character 10. The specific content is similar to the foregoing solution, and therefore is not described again.

In step 3102, according to a comparison result of the corresponding distance d and the preset distance information D, a sub-render processing mode corresponding to the virtual resource group 20 is determined. Different sub-render processing modes correspond to different virtual resource models, where each virtual resource 21 or virtual resource group 20 includes at least two virtual resource models, and different virtual resource models correspond to different numbers of geometric patches 211.

Figure 5:
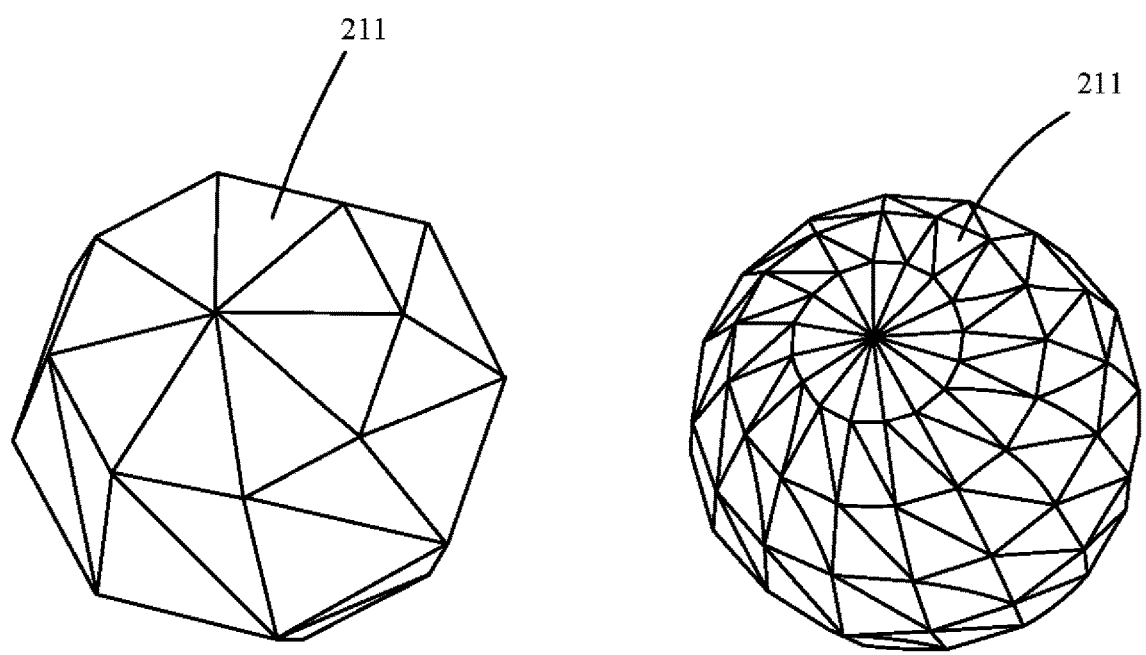
FIG. 5 is a virtual resource model with different geometric patches according to an embodiment of the present disclosure.

For example, as shown in FIG. 5, a virtual resource 21 includes a first virtual resource model and a second virtual resource model. The number of geometric patches 211 corresponding to the first virtual resource model is less than the number of geometric patches 211 corresponding to the second virtual resource model. The virtual resource 21 distant from the virtual character 10 by the corresponding distance d that meets the preset distance information D corresponds to the first sub-render processing, and the virtual resource 21 distant from the virtual character 10 by the corresponding distance d that exceeds the preset distance information D corresponds to the second sub-render processing. The first sub-render processing corresponds to the first virtual resource model, and the second sub-render processing corresponds to the second virtual resource model.

In step S3103, a first rendering parameter of the virtual resource group 20 corresponding to the sub-render processing mode is acquired, and sub-render processing is performed according to the first rendering parameter and in a unit of the virtual resource group 20. The first rendering parameter is a parameter related to the specific performance in all the virtual resources 21 constituting the virtual resource group 20. Further, the first rendering parameter is a parameter related to the specific performance of the virtual resource model corresponding to the virtual resource group 20 or the virtual resource 21.

For example, in the game scene, there are multiple virtual resource groups 20, the virtual resource group 20 close to the virtual character 10 corresponds to the first sub-render processing, and a first virtual resource model of the virtual resource group 20 corresponding to the first sub-render processing is determined. The first virtual resource model has multiple geometric patches 211, a first rendering parameter of the first virtual resource model is acquired, the first sub-render processing is performed on the virtual resource group 20 according to the first rendering parameter, and for other virtual resource groups 20 far away from the virtual character 10, the corresponding render processing is performed according to the above method. In this way, resource allocation for rendering the virtual resource 21 can be achieved, thereby obtaining a higher rendering operation.

In step S320, according to a preset condition, at least one of the virtual resources 21 constituting the virtual resource group 20 is determined to be a particular virtual resource 22. The virtual resource group 20 is composed of multiple virtual resources 21, and the particular virtual resource 22 is at least one virtual resource 21 in the virtual resource group 20 that meets a preset condition.

In the present implementation manner, the step that at least one of the virtual resources 21 constituting the virtual resource group 20 is determined to be a particular virtual resource 22 according to a preset condition includes the following operations.

At step S3201, in response to an attack instruction, it is detected whether the virtual resource 21 is attacked by the virtual character 10.

Figure 6:
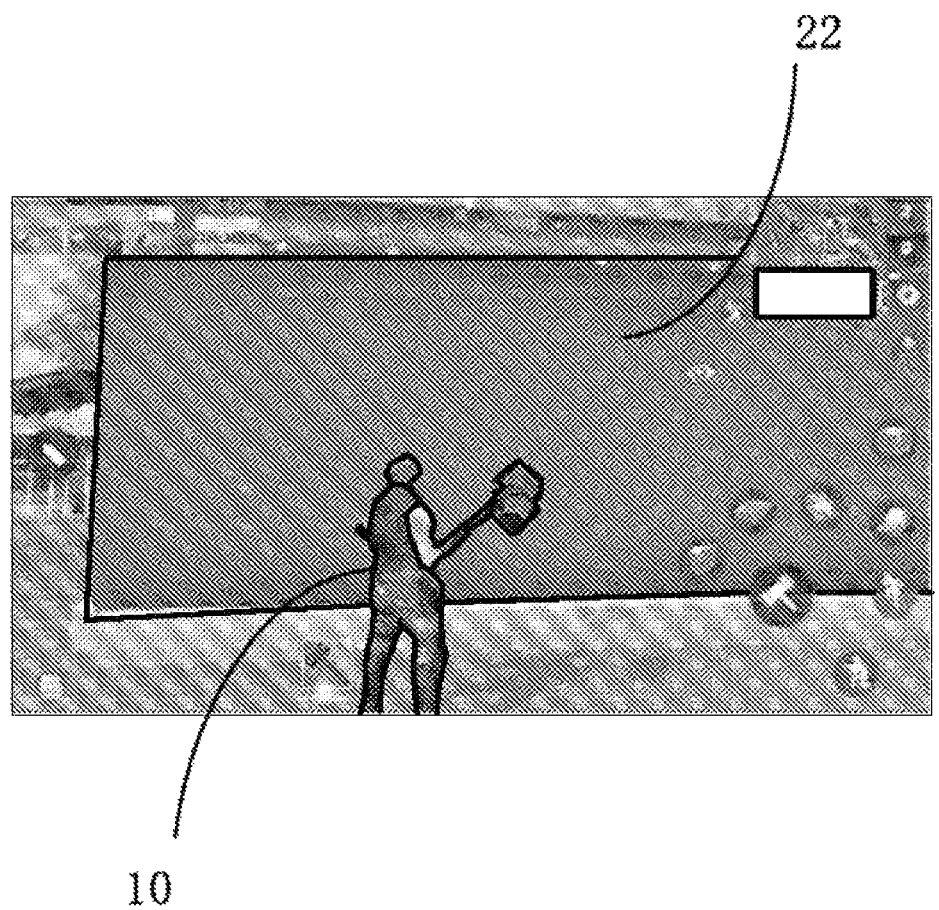
FIG. 6 is a schematic diagram of determining a particular virtual resource according to an embodiment of the present disclosure.

As shown in FIG. 6, the attack instruction is a trigger instruction that controls the virtual character 10 to attack the virtual resource 21 in the game scene. The step of responding to an attack instruction includes: responding to a touch operation of a user on a preset attack instruction control on a graphical user interface, the preset attack instruction control allowing the user to control, according to the received touch operation of the user, the virtual character 10 to attack the virtual resource 21. The preset attack instruction control in the graphical user interface is arranged at a display edge. In the present implementation manner, the preset attack instruction control is arranged at a lower edge of the display interface. In other implementation manners, the preset attack instruction control may be arranged at a left edge or a right edge. In other implementation manners, the preset attack instruction control may be arranged at other positions according to a custom operation of the user. The preset attack instruction control has a significant characteristic parameter, which is used to facilitate the user to quickly locate the position of the preset attack instruction control. In the present implementation manner, the significant characteristic parameter is different from other virtual control shape parameters. In other implementation manners, the significant feature parameter may be a flicker parameter and/or a color parameter or the like that is different from other virtual controls.

In the present implementation manner, the step of responding to a touch operation of a user on a preset attack instruction control on a graphical user interface includes that: an open gesture for a preset starting attack mode is set on a game setting interface, it is determined that an input operation of the open gesture is received, and the virtual character 10 is controlled to attack the virtual resource 21 in the game scene. A receiving area of the open gesture may be a preset area or a blank area of the graphical user interface, where the blank area is an area of the game interface that does not include other virtual spaces. In the present implementation manner, when it is detected that the virtual character 10 is in an attack mode, the preset attack instruction control is controlled to be displayed on a user interface. In the present implementation manner, the manner of displaying the preset attack instruction control may be: displaying an icon in the blank area of the user interface, where the icon is configured to enable the user to control the virtual character 10 to attack the virtual resource 21 by receiving the touch operation of the user. In other implementation manners, the manner of displaying the preset attack instruction control may be: replacing an icon at other positions of the user interface with an icon for enabling the user to control the virtual character 10 to attack the virtual resource 21 by receiving the touch operation of the user.

In other implementation manners, the step of responding to an attack instruction includes that: a physical button of the mobile terminal is associated with the attack instruction, and when the mobile terminal detects that the physical button is pressed, the virtual character 10 is controlled to attack the virtual resource 21. In other implementation manners, the virtual character 10 is controlled to attack the virtual resource 21 by a preset audio instruction.

By the above implementation manner, the user can clearly and quickly determine the preset attack instruction control to control the virtual character 10 to attack the virtual resource 21, thereby facilitating user operations and improving the user experience.

At step S3202, when it is detected that the virtual resource 21 is attacked by the virtual character 10, the attacked virtual resource 21 is determined as a first particular virtual resource 22. In the present implementation manner, the step includes the following operations.

At step 1, a weapon type currently used by the virtual character 10 is acquired.

Specifically, the virtual character 10 may obtain different weapons by purchasing or picking up, a weapon control is provided on the user interface, and the weapon control is used for displaying and receiving the touch operation of the user to control the virtual character 10 to use the weapon corresponding to the weapon control, where the number of weapon controls may be the same as the number of weapons possessed by the virtual character 10, or may be other numbers, the weapon control may be in one-to-one association with the weapon, or may be in many-to-one association with the weapon. The weapon corresponding to a weapon icon that is triggered is acquired to determine the weapon type currently used by the virtual character 10.

At step 2, a preset determination method corresponding to the weapon type is acquired according to the weapon type, and it is detected whether the virtual resource 21 is attacked by the virtual character 10 according to the preset determination method.

Specifically, the preset determination method is to determine whether the weapon currently used by the virtual character 10 and the virtual resource 21 physically collide.

In the present implementation manner, the preset determination method includes at least one of the following: when the weapon type is a remote weapon, the preset determination method is a first detection method. The first detection method is to emit a ray to the game scene from a preset position of the graphical user interface according to the current orientation of the virtual character 10, wherein the preset position may be an aim point position or an arbitrary position of the graphical user interface, the ray may be a non-visible ray or may also be a visible ray, and the ray is used to detect the virtual resource 21 that collides on a path.

When the weapon type is a close-in weapon, the preset determination method is a second detection method. The second detection method is to provide a virtual resource 21 bounding box and a weapon bounding box for the virtual resource 21 within the preset range in the game scene and the weapon currently used by the virtual character 10 to detect whether the virtual resource 21 bounding box and the weapon bounding box intersect. In the present implementation manner, the preset range may be all virtual resources 21 in the game scene. In other implementation manners, within the preset range, the corresponding virtual resource 21 is acquired according to the information by acquiring the position and direction of the virtual character 10. By such an implementation manner, the data computation load can be effectively reduced, and the processing efficiency can be improved.

At step 3, the attacked virtual resource 21 is determined to be a particular virtual resource 22.

In other implementation manners, the step that at least one of the virtual resources 21 constituting the virtual resource group 20 is determined to be a particular virtual resource 22 according to a preset condition includes the following operations.

At step S3203, location information and direction information of the virtual character 10 are acquired.

Figure 7:
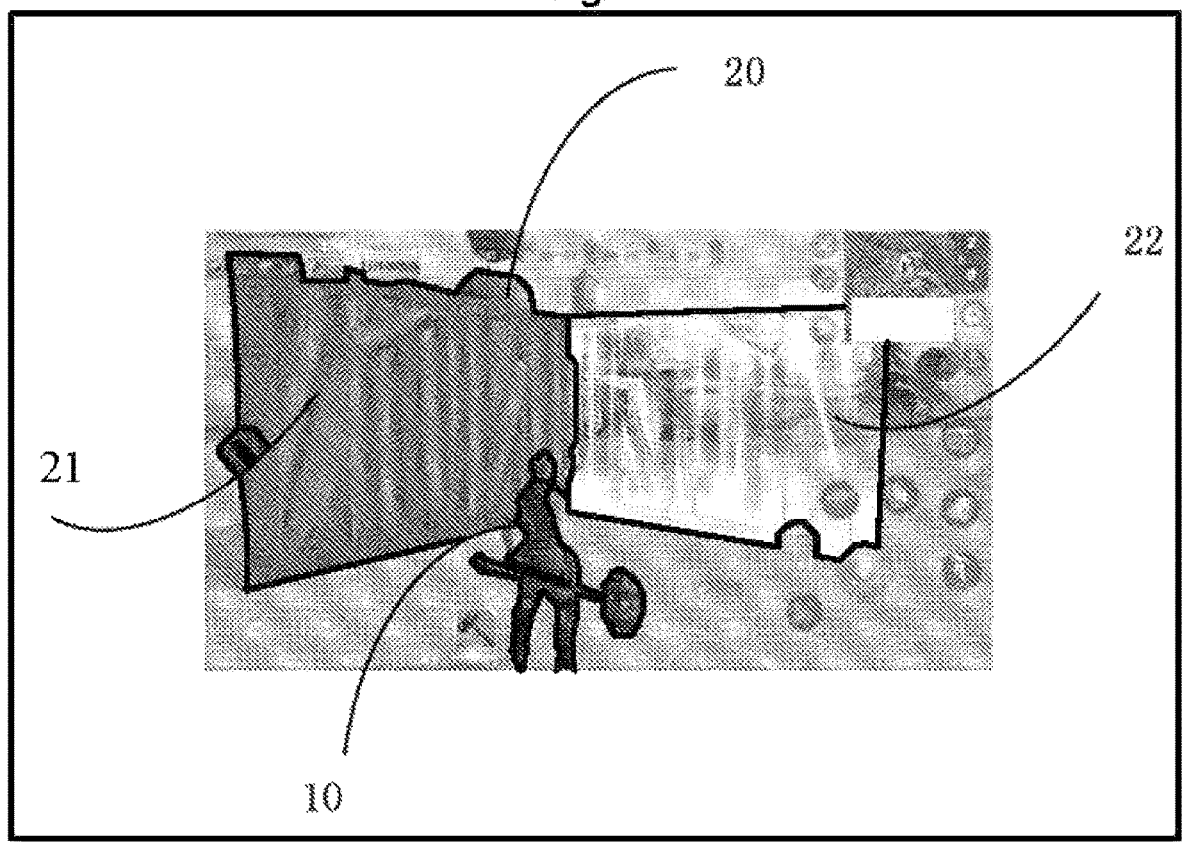
FIG. 7 is another schematic diagram of determining a particular virtual resource according to an embodiment of the present disclosure.

As shown in FIG. 7, a coordinate system is provided in the game scene, and the location of the virtual character 10 is determined by coordinate information on the coordinate system. In the present implementation manner, the location information of the virtual character 10 is the coordinate information, and may be, for example, a point coordinate value of the foot or a point coordinate value of the body center. In other implementation manners, the location information of the virtual character 10 may be defined by other definitions.

The direction information of the virtual character 10 is information for determining the content of the current game picture. In the present implementation manner, the direction information of the virtual character 10 is the direction information of the virtual character 10, and in other implementation manners, the direction information of the virtual character 10 is perspective information of the virtual character 10. Specifically, acquiring the direction information of the virtual character 10 or acquiring the perspective of the virtual character 10 may be achieved by acquiring direction information of a virtual camera for acquiring the content of the current game picture.

At step S3204, according to the location information and the direction information, it is determined that the virtual resource 21 distant from the virtual character 10 by a preset distance is the particular virtual resource 22. The value of the preset distance may be set by the developer or customized according to the needs of the user.

In step S330, the particular virtual resource 22 is processed in a preset first processing manner, and a preset visual effect is presented. The particular virtual resource 22 is at least one virtual resource 21 in the corresponding virtual resource group 20, and after determining the particular virtual resource 22 according to the preset condition, the virtual resources 21 other than the particular virtual resource 22 are rendered by the first render processing, and the particular virtual resource 22 is processed by the second processing manner to present a preset visual effect.

In the present implementation manner, the step that the particular virtual resource 22 is processed in a preset first processing manner and a preset visual effect is presented includes the following operations.

At step S3301, a second rendering parameter corresponding to the preset visual effect is determined.

At step S3302, second render processing is performed on the particular virtual resource 22 according to the second rendering parameter, and a processed preset visual effect is presented.

Through the above implementation manner, the processor rendering resources required for rendering the virtual resource group 20 can be reduced, and a preset visual effect can be implemented.

Each step of the processing method for a virtual resource in a game scene in the present exemplary embodiment will be further described below.

In step S3301, a second rendering parameter corresponding to the preset visual effect is determined.

In the present implementation manner, the preset visual effects are vibration and crack effects. A rendering attribute corresponding to the preset visual effect is acquired, and a second rendering parameter of the rendering attribute corresponding to the preset visual effect is determined.

Figure 8:
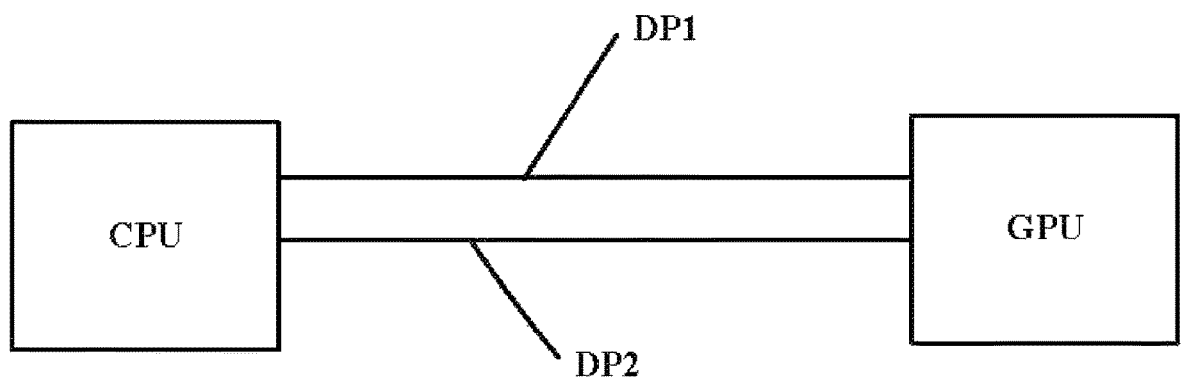
FIG. 8 is a schematic diagram of communication between a CPU and a GPU according to an embodiment of the present disclosure.

In step S3302, second render processing is performed on the particular virtual resource 22 according to the second rendering parameter. As can be seen from the foregoing description, the parameters related to the specific performance of the virtual resource 21 in the game scene are stored in the vertex information. Therefore, the second rendering parameter is stored in the vertex information of the particular virtual resource 22. As shown in FIG. 8, the second rendering parameter is derived from the first rendering parameter, the first rendering parameter and the second rendering parameter are respectively sent to the graphics processor through different rendering instructions, and the particular virtual resource 22 and the virtual resources 21 in the virtual resource group 20 other than the particular virtual resource 22 are rendered. When receiving a rendering instruction DP1 for rendering the particular virtual resource 22, the processor sends vertex information for rendering the particular virtual resource 22 to the graphics processor. The graphics processor extracts the second rendering parameter in the vertex information, and performs second render processing on the particular virtual resource 22 according to the second rendering parameter. Meanwhile, when the virtual resources 21 in the virtual resource group 20 other than the particular virtual resource 22 are rendered, the processor sends the vertex information of the virtual resources 21 in the virtual resource group 20 other than the particular virtual resource 22 to the graphics processor through a rendering instruction DP2, and the graphics processor extracts the first rendering parameter in the vertex information, and performs first render processing on the particular virtual resource 22 according to the first rendering parameter.

Through the above implementation manner, when a game program renders the virtual resource group 20, the first render processing is still performed in a unit of the virtual resource group 20 according to the first rendering parameter. In the process, parameter information originally used for controlling the particular virtual resource 22 is not included, the particular virtual resource 22 is processed in a second processing manner by another rendering pipeline independent of a rendering pipeline corresponding to the first render processing, so that there is no need to read the parameter information of the particular virtual resource 22 in the memory, the parameter information is used to achieve a preset visual effect, and the rendering efficiency can be effectively improved.

In other implementation manners, the step that the particular virtual resource 22 is processed in a preset first processing manner and a preset visual effect is presented includes the following operations.

At step S33011, the particular virtual resource 22 is hidden. When the particular virtual resource 22 is determined according to the preset condition, the particular virtual resource 22 is hidden. For example, when it is detected that the virtual resource 21 in the virtual resource group 20 is attacked, the virtual resource 21 is determined to be the particular virtual resource 22 and hidden. It is to be noted that this step may not be performed.

At step S33012, a substitute virtual resource 21 is generated according to the particular virtual resource 22, and third render processing is performed on the substitute virtual resource 21. Third render processing is performed on the substitute virtual resource 21, and a processed preset visual effect is presented.

In the present implementation manner, the operation that a substitute virtual resource 21 is generated according to the particular virtual resource 22 may be implemented by the following steps.

At step a, location information and parameter information of the particular virtual resource 22 are acquired.

Specifically, the location information is vertex coordinate information of the particular virtual resource 22 in the coordinate system, and the parameter information includes, but is not limited to, scaling, rotation information, and the like.

At step b, the substitute virtual resource 21 is generated at a location corresponding to the location information according to the parameter information.

In the present implementation manner, the step that third render processing is performed on the particular virtual resource 21 includes that: a third rendering parameter corresponding to the preset visual effect is determined; and third render processing is performed on the substitute virtual resource 21 according to the third rendering parameter. The implementation of how to determine the third rendering parameter and the third render processing for the substitute virtual resource 21 according to the third rendering parameter is similar to that described above with respect to step S3301 and step S3302, and therefore will not be described here.

The difference between this step and the above description is that, in the present implementation manner, the first rendering parameter includes first illumination information, and the first render processing is performed on the virtual resource group 20 according to the first illumination information. The first illumination information is information for achieving an illumination effect of the virtual resource group 20, and the first illumination information includes first direct illumination information and first indirect illumination information. The type of the first direct illumination information includes direct illumination and shadow information. The type of direct illumination includes dynamic direct light and baked direct light, and the type of shadow information includes dynamic direct shadows and baked shadows. The dynamic direct light provides real-time illumination through dynamic light, and the baked direct light provides illumination in an illumination mapping manner. The dynamic direct shadows are dynamic real-time shadows, and the baked shadows provide shadows in an illumination mapping manner. The first indirect illumination information provides indirect light through illumination maps.

The third rendering parameter includes third illumination information, and the third render processing is performed on the virtual resource group 20 according to the third illumination information. The third illumination information includes third direct illumination information, where the content of the third direct illumination information is similar to most of the content of the first direct illumination information and will not be repeated, and the third direct illumination information is different from the first direct illumination information in that: the brightness value of the third direct illumination information is determined according to the first direct illumination information and the first indirect illumination information. In the present implementation manner, the brightness value of the third direct illumination information is determined by acquiring the sum of the brightness value of direct illumination in the first rendering parameter of the virtual resource group 20 where the particular virtual resource 22 corresponding to the substitute virtual resource 21 is located, and the brightness value of the first indirect illumination information.

Since the first indirect illumination information of the virtual resource 21 or the virtual resource group 20 in the game scene is implemented by illumination maps, the third rendering parameter for rendering the regenerated substitute virtual resource 21 does not include indirect light, so when the particular virtual resource 22 is hidden and the substitute virtual resource 21 is displayed, the brightness of the substitute virtual resource 21 may be lower than that of the adjacent other virtual resources 21. According to the above implementation manner, the brightness of the regenerated substitute virtual resource 21 may be close to the brightness of the adjacent other virtual resources 21, thereby improving the user experience.

In the present implementation manner, the types of direct illumination and shadow information in the first illumination information for rendering the illumination effect of the virtual resource group 20 in the first rendering parameter are determined according to the corresponding distance d between the virtual resource group 20 and the virtual character 10. When the corresponding distance d between the virtual resource group 20 and the virtual character 10 is less than or equal to the preset distance information D, the types of direct illumination and shadow information in the first illumination information for rendering the illumination effect of the virtual resource group 20 in the first rendering parameter are dynamic direct light and dynamic direct shadows respectively. When the corresponding distance d between the virtual resource group 20 and the virtual character 10 is greater than the preset distance information D, the types of direct illumination and shadow information in the first illumination information for rendering the illumination effect of the virtual resource group 20 in the first rendering parameter are baked direct light and baked direct shadows respectively. After determining the first illumination information corresponding to the virtual resource group 20, rendering is performed in the sub-render processing mode corresponding to the virtual resource 21 according to the first rendering parameter that includes the corresponding first illumination information.

In other implementation manner, the types of direct illumination and shadow information in the first illumination information for rendering the illumination effect of the virtual resource group 20 in the first rendering parameter are determined according to the performance of the mobile terminal running the game program. In other implementation manner, the types of direct illumination and shadow information in the first illumination information for rendering the illumination effect of the virtual resource group 20 in the first rendering parameter may be customized by the settings of a game developer or the needs of a user.

Through the above implementation manner, when the substitute virtual resource closer to the virtual character is removed, since the shadow of the removed area is an occlusion relationship calculated in real time, when the occluded substitute virtual resource is removed, the original shadow of the substitute virtual resource disappears.

Figure 9:
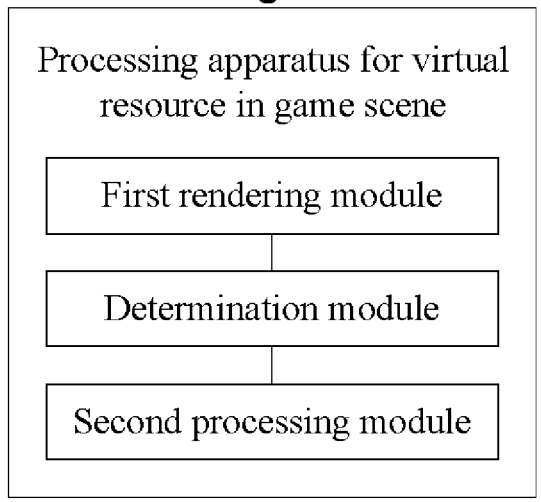
FIG. 9 is a composition diagram of a processing apparatus according to an embodiment of the present disclosure.

As shown in FIG. 9, an exemplary embodiment further discloses a processing apparatus for a virtual resource 21 in a game scene. The apparatus includes: a first rendering module, a determination module and a second processing module.

The first rendering module is configured to combine, according to a preset rule, multiple virtual resources 21 to form a virtual resource group 20, acquire a first rendering parameter of the virtual resource group 20, and perform first render processing according to the first rendering parameter and in a unit of the virtual resource group 20.

The determination module 20 is configured to determine, according to a preset condition, at least one of the virtual resources 21 constituting the virtual resource group 20 to be a particular virtual resource 22.

The second processing module is configured to process the particular virtual resource 22 in a preset first processing manner, and present a preset visual effect.

Specific details of various module units in the above embodiment have been described in detail in the corresponding processing method for a virtual resource in a game scene. In addition, it can be understood that the processing apparatus for a virtual resource in a game scene further includes other unit modules corresponding to those in the processing method for a virtual resource in a game scene. Therefore, detail descriptions are omitted herein.

It is to be noted that although several modules or units of the device for action execution are mentioned in the above detailed description, such division is not mandatory. In fact, according to the implementation manners of the disclosure, the features and functions of two or more modules or units described above may be embodied in one module or unit. Conversely, the features and functions of one module or unit described above may be further divided into multiple modules or units and embodied.

Figure 10:
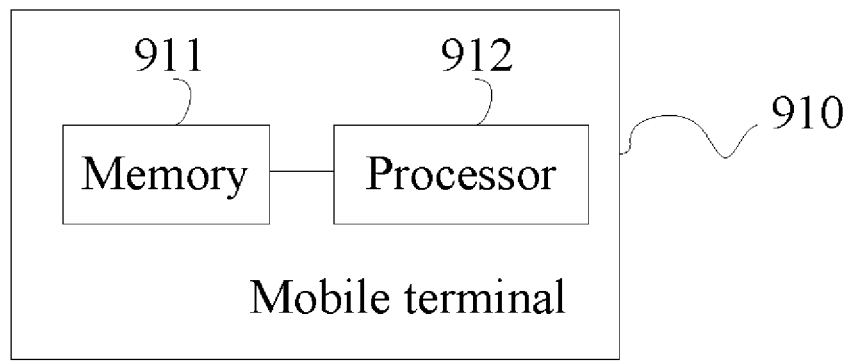
FIG. 10 is a composition diagram of a mobile terminal according to an embodiment of the present disclosure.

FIG. 10 is a structure schematic diagram of a mobile terminal according to an embodiment of the present disclosure. As shown in FIG. 10, the mobile terminal 910 of the present embodiment includes: a memory 911 and a processor 912. The memory 911 and the processor 912 may be connected by a bus. A software application is executed on a processor of a terminal, and rendering is performed on a display device of the terminal to obtain a graphical user interface.

The processor is configured to execute the executable instruction to implement the following steps.

According to a preset rule, multiple virtual resources 21 are combined to form a virtual resource group 20, a first rendering parameter of the virtual resource group 20 is acquired, and first render processing is performed according to the first rendering parameter and in a unit of the virtual resource group 20.

According to a preset condition, at least one of the virtual resources 21 constituting the virtual resource group 20 is determined to be a particular virtual resource 22.

The particular virtual resource 22 is processed in a preset first processing manner, and a preset visual effect is presented.

Optionally, the step that the particular virtual resource 22 is processed in a preset first processing manner and a preset visual effect is presented includes that: a second rendering parameter corresponding to the preset visual effect is determined; and second render processing is performed on the particular virtual resource 22 according to the second rendering parameter, and a processed preset visual effect is presented.

Optionally, the step that the particular virtual resource 22 is processed in a preset first processing manner includes that: a substitute virtual resource 21 is generated according to the particular virtual resource 22, and third render processing is performed on the substitute virtual resource 21.

Optionally, the step that the particular virtual resource 22 is processed in a preset first processing manner includes that: the particular virtual resource 22 is hidden.

Optionally, the step that a substitute virtual resource 21 is generated according to the particular virtual resource 22 includes that: location information and parameter information of the particular virtual resource 22 are acquired, and the substitute virtual resource 21 is generated at a location corresponding to the location information according to the parameter information.

Optionally, the first render processing is to perform render processing on the virtual resource group 20 according to first illumination information, the first illumination information including first direct illumination information and first indirect illumination information; and the third render processing is to perform render processing on the substitute virtual resource 21 according to the third illumination information, the third illumination information including third direct illumination information, and the third direct illumination information being determined according to the first direct illumination information and the first indirect illumination information.

Optionally, the step that the virtual resources 21 constituting the virtual resource group 20 are determined to be a particular virtual resource 22 according to a preset condition includes that: in response to an attack instruction, it is detected whether the virtual resource 21 is attacked by the virtual character 10; and when it is detected that the virtual resource 21 is attacked by the virtual character 10, the attacked virtual resource 21 is determined as a first particular virtual resource 22.

Optionally, the step that the virtual resources 21 constituting the virtual resource group 20 are determined to be a particular virtual resource 22 according to a preset condition includes that: location information and direction information of the virtual character 10 are acquired; and according to the location information and the direction information, it is determined that the virtual resource 21 distant from the virtual character 10 by a preset distance is the particular virtual resource 22.

Optionally, the first render processing includes at least two sub-render processing modes divided according to preset distance information D, where the preset distance information D is determined according to current state information of the virtual character 10, and the step that first render processing is performed according to the first rendering parameter and in a unit of the virtual resource group 20 includes that: a corresponding distance d between the virtual resource group 20 and the virtual character 10 is determined according to the state information of the virtual character 10; according to a comparison result of the corresponding distance d and the preset distance information D, a corresponding sub-render processing mode is determined; and the virtual resource 21 or the virtual resource group 20 corresponding to the distance d is processed by the determined corresponding sub-render processing mode.

By means of the mobile terminal provided by the present disclosure, multiple virtual resource groups 20 in a game scene are combined into a virtual resource group 20 according to a preset rule, a first rendering parameter of the virtual resource group 20 is acquired during rendering, and then a rendering action of rendering the resource group is completed by acquiring the first rendering parameter once, thereby effectively reducing the number of DC and improving the usage rate of a processor. When interacting with a virtual resource 21 in the game scene, for example, performing operations such as attack, disassembly and repair, at least one of the virtual resources 21 in the virtual resource group 20 is determined as a particular virtual resource 22 according to a preset condition, and the particular virtual resource 22 is processed in a second processing mode different from a first rendering process mode. In this way, in the case of reducing DC and improving the usage rate of the processor, the virtual resource 21 in the virtual resource group 20 may be independently processed to achieve a preset visual effect.

In an optional implementation manner, the mobile terminal may further include one or more processors, and a memory resource represented by the memory and configured to store an instruction executable by a processing component, such as an application program. The application program stored in the memory may include one or more modules each corresponding to a set of instructions. In addition, the processing component is configured to execute instructions to perform the above-described processing method for a virtual resource in a game scene.

The mobile terminal may also include: a power supply component, configured to perform power management on the mobile terminal; a wired or wireless network interface, configured to connect the mobile terminal to a network; and an input output (I/O) interface. The mobile terminal may operate based on an operating system stored in the memory, such as Android, iOS, Windows, Mac OS X, Unix, Linux, FreeBSD, or the like.

Figure 11:
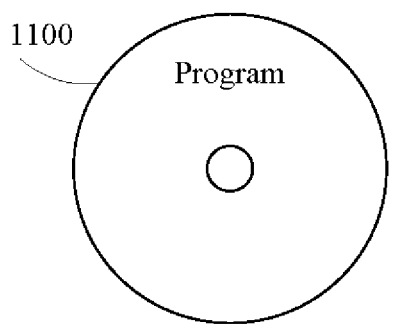
FIG. 11 is a structure schematic diagram of a storage medium according to an embodiment of the present disclosure.

FIG. 11 is a structure schematic diagram of a computer storage medium according to an embodiment of the present disclosure. As shown in FIG. 11, a program product 1100 according to an implementation manner of the present disclosure is described. A computer program is stored thereon. When being executed by a processor, the computer program implements the following steps.

According to a preset rule, multiple virtual resources 21 are combined to form a virtual resource group 20, a first rendering parameter of the virtual resource group 20 is acquired, and first render processing is performed according to the first rendering parameter and in a unit of the virtual resource group 20.

According to a preset condition, at least one of the virtual resources 21 constituting the virtual resource group 20 is determined to be a particular virtual resource 22.

The particular virtual resource 22 is processed in a preset first processing manner, and a preset visual effect is presented.

Optionally, the step that the particular virtual resource 22 is processed in a preset first processing manner and a preset visual effect is presented includes that: a second rendering parameter corresponding to the preset visual effect is determined; and second render processing is performed on the particular virtual resource 22 according to the second rendering parameter, and a processed preset visual effect is presented.

Optionally, the step that the particular virtual resource 22 is processed in a preset first processing manner includes that: a substitute virtual resource 21 is generated according to the particular virtual resource 22, and third render processing is performed on the substitute virtual resource 21.

Optionally, the step that the particular virtual resource 22 is processed in a preset first processing manner includes that: the particular virtual resource 22 is hidden.

Optionally, the step that a substitute virtual resource 21 is generated according to the particular virtual resource 22 includes that: location information and parameter information of the particular virtual resource 22 are acquired, and the substitute virtual resource 21 is generated at a location corresponding to the location information according to the parameter information.

Optionally, the first render processing is to perform render processing on the virtual resource group 20 according to first illumination information, the first illumination information including first direct illumination information and first indirect illumination information; and the third render processing is to perform render processing on the substitute virtual resource 21 according to the third illumination information, the third illumination information including third direct illumination information, and the third direct illumination information being determined according to the first direct illumination information and the first indirect illumination information.

Optionally, the step that the virtual resources 21 constituting the virtual resource group 20 are determined to be a particular virtual resource 22 according to a preset condition includes that: in response to an attack instruction, it is detected whether the virtual resource 21 is attacked by the virtual character 10; and when it is detected that the virtual resource 21 is attacked by the virtual character 10, the attacked virtual resource 21 is determined as a first particular virtual resource 22.

Optionally, the step that the virtual resources 21 constituting the virtual resource group 20 are determined to be a particular virtual resource 22 according to a preset condition includes that: location information and direction information of the virtual character 10 are acquired; and according to the location information and the direction information, it is determined that the virtual resource 21 distant from the virtual character 10 by a preset distance is the particular virtual resource 22.

Optionally, the first render processing includes at least two sub-render processing modes divided according to preset distance information D, where the preset distance information D is determined according to current state information of the virtual character 10, and the step that first render processing is performed according to the first rendering parameter and in a unit of the virtual resource group 20 includes that: a corresponding distance d between the virtual resource group 20 and the virtual character 10 is determined according to the state information of the virtual character 10; according to a comparison result of the corresponding distance d and the preset distance information D, a corresponding sub-render processing mode is determined; and the virtual resource 21 or the virtual resource group 20 corresponding to the distance d is processed by the determined corresponding sub-render processing mode.

By means of the computer storage medium provided by one embodiment of the present disclosure, when a virtual character interacts with a virtual resource in a game scene, for example, performing operations such as attack, disassembly and repair, at least one of the virtual resources in the virtual resource group is determined as a particular virtual resource according to a preset condition, and the particular virtual resource is processed in a second processing mode different from a first rendering process mode. In this way, in the case of reducing DC and improving the usage rate of the processor, the virtual resource in the virtual resource group may be independently processed to achieve a preset visual effect. The computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, device or apparatus.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will readily understand that the example implementation manners described herein may be implemented by software or by software in combination with necessary hardware. Therefore, the technical solution according to the embodiment of the disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the disclosure.

Other embodiments of the disclosure will be apparent to those skilled in the art after considering the specification and practicing the disclosure herein. The present disclosure is intended to cover any variations, uses, or adaptations of the disclosure, which are in accordance with the general principles of the disclosure and include common general knowledge or conventional technical means in the art that are not disclosed in the disclosure. The specification and examples are to be regarded as illustrative only, and the true scope and spirit of the disclosure are pointed out by the claims.

It is to be understood that the disclosure is not limited to the accurate structure that have been described and shown in the drawings, and may make various modifications and variations without departing the scope thereof. The scope of the disclosure is limited only by the appended claims.

INDUSTRIAL APPLICABILITY

The solution provided by the embodiment of the present disclosure may be applied to a game rendering aspect, multiple virtual resources in a game scene are combined into a virtual resource group according to a preset rule, a first rendering parameter of the virtual resource group is acquired when performing rendering, and then the rendering action of the rendering resource group is completed by acquiring the first rendering parameter once, thereby effectively reducing the number of rendering times and improving the usage rate of a processor.

What is claimed is:

1. A processing method for a virtual resource in a game scene, comprising:
   acquiring a first rendering parameter of a virtual resource group consisting of a plurality of virtual resources satisfying a preset rule, and performing, according to the first rendering parameter, a first render processing on the virtual resource group as a unit, wherein the preset rule is determined according to parameter information of the plurality of virtual resources, and the first rendering parameter is a parameter related to a specific performance in the plurality of virtual resources constituting the virtual resource group;
   determining, according to a preset condition, at least one of the virtual resources constituting the virtual resource group as a particular virtual resource; and
   processing the particular virtual resource in a preset first processing manner, and presenting a preset visual effect;
   wherein processing the particular virtual resource in the preset first processing manner comprises: generating a substitute virtual resource according to the particular virtual resource, and performing a third render processing on the substitute virtual resource;
   wherein the first render processing refers to performing render processing on the virtual resource group according to first illumination information, the first illumination information comprising first direct illumination information and first indirect illumination information wherein the first render processing refers to performing render processing on the virtual resource group according to first illumination information, the first illumination information comprising first direct illumination information and first indirect illumination information; and the third render processing refers to performing render processing on the substitute virtual resource according to third illumination information, the third illumination information comprising third direct illumination information, the third direct illumination information is determined according to the first direct illumination information and the first indirect illumination information;
   wherein performing render processing on the virtual resource group according to the first illumination information comprises: determining types of direct illumination and shadow information in the first illumination information for rendering the illumination effect of the virtual resource group in the first rendering parameter according to the corresponding distance between the virtual resource group and the virtual character.

2. The processing method as claimed in claim 1, wherein processing the particular virtual resource in the preset first processing manner, and presenting the preset visual effect comprises:
   determining a second rendering parameter corresponding to the preset visual effect, and
   performing a second render processing on the particular virtual resource according to the second rendering parameter, and presenting the preset visual effect.

3. The processing method as claimed in claim 2, wherein the first render processing comprises at least two sub-render processing modes divided according to preset distance information, wherein the preset distance information is determined according to current state information of a virtual character, and acquiring the first rendering parameter of the virtual resource group, and performing, according to the first rendering parameter, a first rendering on the virtual resource group as a unit comprises:
   determining a corresponding distance between the virtual resource group and the virtual character according to the current state information of the virtual character;
   determining, according to a comparison result of the corresponding distance and the preset distance information, a sub-render processing mode corresponding to the virtual resource group; and
   acquiring the first rendering parameter of the virtual resource group corresponding to the sub-render processing mode, and performing, according to the first rendering parameter, sub-render processing on the virtual resource group as a unit.

4. The processing method as claimed in claim 1, wherein processing the particular virtual resource in the preset first processing manner comprises: hiding the particular virtual resource.

5. The processing method as claimed in claim 1, wherein generating the substitute virtual resource according to the particular virtual resource comprises:
   acquiring location information and parameter information of the particular virtual resource, and
   generating the substitute virtual resource at a location corresponding to the location information according to the parameter information.

6. The processing method as claimed in claim 1, wherein determining, according to the preset condition, the virtual resources constituting the virtual resource group to be the particular virtual resource comprises:
   detecting whether a virtual resource is attacked by a virtual character in response to an attack instruction, and
   determining the attacked virtual resource as the particular virtual resource, in response to detecting that the virtual resource is attacked by the virtual character.

7. The processing method as claimed in claim 6, wherein determining the attacked virtual resource as the particular virtual resource, in response to detecting that the virtual resource is attacked by the virtual character comprises:
   acquiring a weapon type currently used by the virtual character;
   acquiring a preset determination method corresponding to the weapon type according to the weapon type, and detecting whether the virtual resource is attacked by the virtual character according to the preset determination method;
   determining the attacked virtual resource as the particular virtual resource.

8. The processing method as claimed in claim 7, wherein the preset determination method is determining whether the weapon currently used by the virtual character and the virtual resource physically collide.

9. The processing method as claimed in claim 1, wherein determining, according to the preset condition, the virtual resources constituting the virtual resource group as the particular virtual resource comprises:
   acquiring location information and direction information of the virtual character, and determining, the virtual resource whose distant from the virtual character satisfying a preset distance as the particular virtual resource, wherein the virtual resource is determined, according to the location information and the direction information.

10. The processing method as claimed in claim 1, wherein the first render processing comprises at least two sub-render processing modes divided according to preset distance information, wherein the preset distance information is determined according to current state information of a virtual character, and acquiring the first rendering parameter of the virtual resource group, and performing, according to the first rendering parameter, a first rendering on the virtual resource group as a unit comprises:
   determining a corresponding distance between the virtual resource group and the virtual character according to the current state information of the virtual character;
   determining, according to a comparison result of the corresponding distance and the preset distance information, a sub-render processing mode corresponding to the virtual resource group; and
   acquiring the first rendering parameter of the virtual resource group corresponding to the sub-render processing mode, and performing, according to the first rendering parameter, sub-render processing on the virtual resource group as a unit.

11. A mobile terminal, comprising:
a processor; and
a memory, configured to store an executable instruction of the processor;

wherein the processor is configured to perform the processing method according to claim 1 by executing the executable instruction.

12. A non-transitory storage medium, comprising a computer program that implements, when executed by a processor, the processing method according to claim 1.

13. The processing method as claimed in claim 1, wherein acquiring a first rendering parameter of a virtual resource group consisting of a plurality of virtual resources satisfying a preset rule is acquiring a first rendering parameter of a virtual resource group consisting of a plurality of virtual resources satisfying parameter information of the virtual resource.

14. The processing method as claimed in claim 13, wherein the parameter information of the virtual resource comprises: location information of the virtual resource, a type of the virtual resource or other parameters that are set according to the efficiency requirements of the game operation.

15. The processing method as claimed in claim 1, wherein performing render processing on the virtual resource group according to first illumination information comprises:
   determining types of direct illumination and shadow information in the first illumination information for rendering the illumination effect of the virtual resource group in the first rendering parameter according to the performance of the mobile terminal running the game program.

* * * * *